(12) United States Patent
Goodman et al.

(10) Patent No.: US 8,825,194 B2
(45) Date of Patent: Sep. 2, 2014

(54) GLOBAL POSITIONING SYSTEM LOCATION INFORMATION FOR AN AUTOMATED DATA STORAGE LIBRARY

(75) Inventors: Brian Gerard Goodman, Tucson, AZ (US); Arthur John Colvig, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 2188 days.

(21) Appl. No.: 10/741,724

(22) Filed: Dec. 18, 2003

(65) Prior Publication Data
US 2005/0137742 A1 Jun. 23, 2005

(51) Int. Cl.
*G06F 7/00* (2006.01)

(52) U.S. Cl.
USPC .................................................. 700/214

(58) Field of Classification Search
USPC ............................... 700/213, 214, 216
See application file for complete search history.

(56) References Cited

U.S. PATENT DOCUMENTS

| | | | |
|---|---|---|---|
| 4,932,826 A | 6/1990 | Moy et al. | |
| 6,175,922 B1 | 1/2001 | Wang | 713/182 |
| 6,336,163 B1 * | 1/2002 | Brewer et al. | 711/112 |
| 6,346,911 B1 | 2/2002 | King | 342/357.06 |
| 6,351,685 B1 | 2/2002 | Dimitri et al. | 700/214 |
| 6,356,801 B1 | 3/2002 | Goodman et al. | 700/214 |
| 6,356,806 B1 | 3/2002 | Grob et al. | 700/245 |
| 6,473,706 B1 * | 10/2002 | Gallo et al. | 702/105 |
| 6,501,429 B2 * | 12/2002 | Nakamura et al. | 343/702 |
| 6,950,722 B2 * | 9/2005 | Mountz | 700/214 |
| 2002/0169903 A1 | 11/2002 | McIntosh et al. | 710/100 |
| 2003/0009392 A1 | 1/2003 | Perkowski | 705/26 |
| 2003/0033032 A1 | 2/2003 | Lind et al. | 700/52 |
| 2003/0053715 A1 | 3/2003 | Chamberlain | 382/294 |
| 2004/0010337 A1 * | 1/2004 | Mountz | 700/214 |
| 2004/0021573 A1 * | 2/2004 | Hoffman et al. | 340/573.1 |

FOREIGN PATENT DOCUMENTS

| | | | | |
|---|---|---|---|---|
| EP | 899648 | 8/1998 | | G06F 1/00 |
| JP | 2003-140930 | 5/2003 | | G06F 12/00 |
| JP | 2003-256649 | 9/2003 | | G06F 17/60 |
| JP | 2003-271316 | 9/2003 | | G06F 3/06 |
| JP | J2004-199665 | 7/2004 | | G05D 1/02 |

* cited by examiner

*Primary Examiner* — Ramya Burgess
(74) *Attorney, Agent, or Firm* — Terrile, Cannatti, Chambers & Holland, LLP; Stephen A. Terrile

(57) ABSTRACT

Disclosed are a system, a method, and an article of manufacture to provide for the use of a global positioning system (GPS) to provide location information for an automated data storage library. One or more GPS antennas and receivers are coupled to an automated data storage library to enable quick and accurate location information for the automated data storage library. The location information may be used to determine the physical location of the automated data storage library. The GPS antennas may also be attached to one or more library frames in the automated data storage library to enable accurate location information for each frame. The GPS antennas are attached to one or more accessors or one or more drive canisters to provide accurate location information for each component.

34 Claims, 8 Drawing Sheets

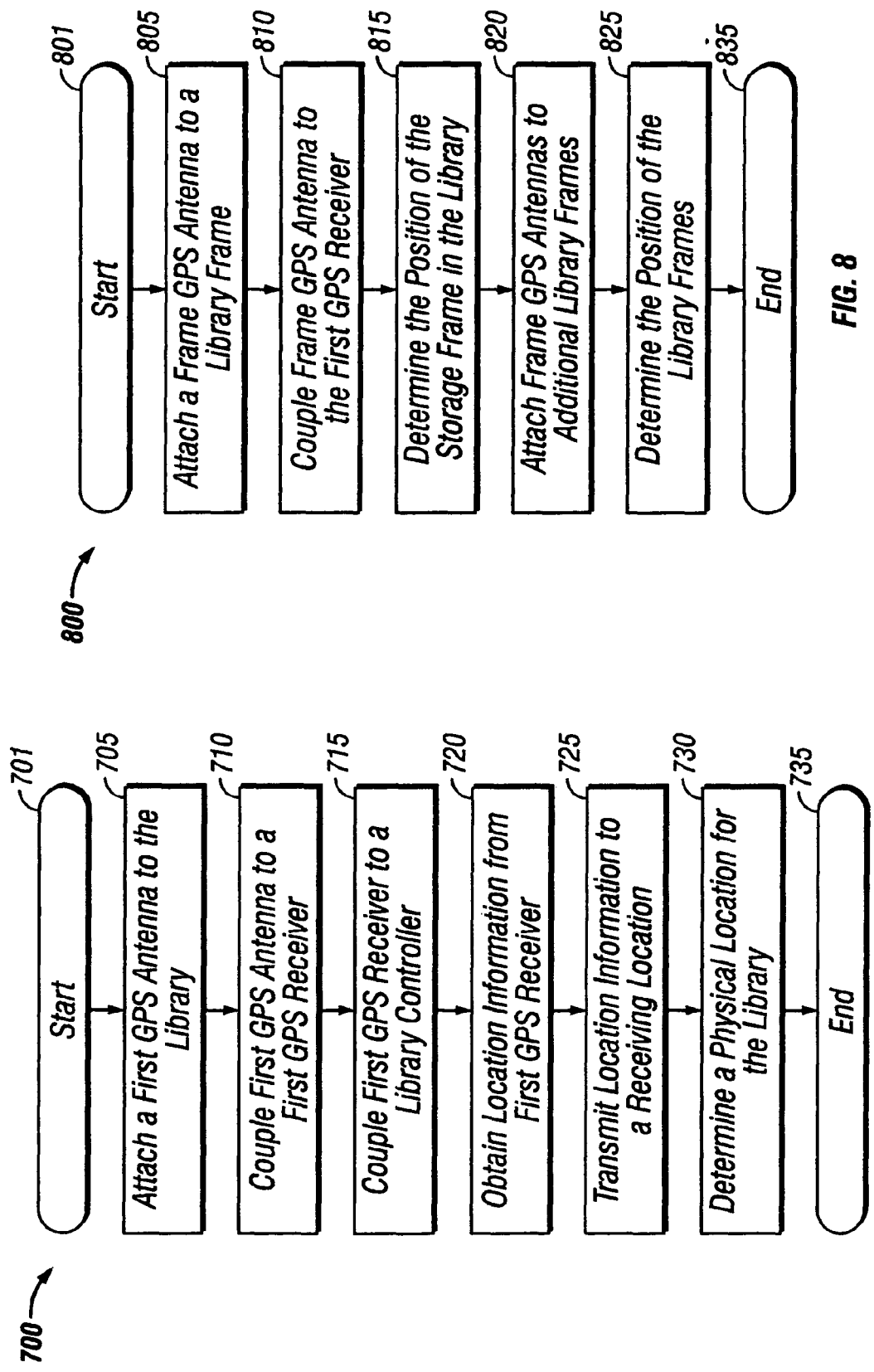

GLOBAL POSITIONING SYSTEM LOCATION INFORMATION FOR AN AUTOMATED DATA STORAGE LIBRARY

TECHNICAL FIELD

The present invention relates to library systems for dynamic information storage or retrieval. More particularly, the invention concerns a method and system to use a global positioning system to provide location information to operate an automated data storage library.

CROSS-REFERENCES TO RELATED APPLICATIONS

The present application is related to application Ser. No. 10/741,723, entitled "Accurate Time Information for the Operation of an Automated Data Storage Library", filed on an even date herewith, the disclosure of which is hereby incorporated by reference in its entirety.

BACKGROUND OF THE INVENTION

Automated data storage libraries provide a means for storing large quantities of data in data storage media that are not permanently mounted on data storage drives, and that are stored in a readily available form on storage shelves. One or more robot accessors retrieve selected data storage media from storage shelves and provide them to data storage drives. Typically, data stored on data storage media of an automated data storage library, once requested, is needed quickly. Thus, it is desirable that an automated data storage library be maintained in an operational condition as much as possible, such as the well known "24×7×365" availability. In order to achieve and maintain this high availability of data from a library, there is a need to eliminate or reduce single points of failure, as well as to improve the efficiency by which such availability is maintained.

Automated data storage libraries are often used to back up critical data. If the automated data storage library encounters operational problems then it is crucial to quickly locate the failing automated data storage library to provide rapid service and repair. A feature often referred to as "Call-Home" is used to expedite service and repair of an automated data storage library. Call-Home is a feature where the library will call a service or repair center when it detects an operational error. Another feature, called "Heartbeat Call-Home" involves a periodic call to a service or repair center as a watchdog function. If the automated data storage library doesn't call at some periodic interval then it may be an indication that there is a problem with the automated data storage library. The physical location is needed to locate the automated data storage library for service or repair. The physical location of the automated data storage library may be entered by an operator or a service technician. This involves human intervention and may be prone to error. For example, the information may never be entered; it may be entered inaccurately or may be entered with insufficient details. In addition, the automated data storage library could be moved and the location information may not be correctly updated. This may result in a critical error that doesn't get serviced in a timely manner because the repair technician couldn't locate the failing library. Therefore there is a need to quickly and automatically locate automated data storage libraries.

Large automated data storage libraries usually comprise modules or frames that allow the size of the library to be controlled by the number of frames that are attached to the library. If a customer needs more storage, then additional frames are added. It is often necessary to obtain quick and accurate location information for each frame located in an automated data storage library. For example, a frame controller may require knowledge of the frame number that it is located in. Prior art methods for locating frames in automated data storage libraries used dip switches or jumpers to identify frames. The problem with this approach is that it involves operator intervention and may be prone to error. For example, an operator may incorrectly set the jumpers or switches. Another approach is the use of an automated frame counting circuit such as the one described in patent application US20020169903A1 titled "Automatic Frame Identification, Door Status, and Frame Count Detection System". The problem with this approach is that it involves additional cabling and connectors. Cables and connections require human intervention and may be prone to error. For example, an operator may incorrectly plug the cables, a pin may become pushed, a cable may be intermittent, etc. In addition, if the frame controller is swapped or replaced then there is additional opportunity for connector failure or operator error because a repair technician may forget to plug the cables or may plug them incorrectly. Therefore there is a need to quickly and automatically locate frames in automated data storage libraries.

Large automated data storage libraries usually comprise one or more accessors for moving data storage media. To accurately control the movement of the accesors it is necessary for the accesssor controller to obtain accurate real time position information for the location of the accessor. Prior art methods for accessor position information use home position sensors, tachometers, etc. The problem with this approach is that it involves cabling between the sensors and the controller, the sensors may become dirty, etc. For example, a library may be powered off with the accessor located anywhere within the library. When the library is powered on, the library controller may not be able to determine the precise location of the accessor. Slow movement of the accessor to a home position may be used to provide a precise reference location for the accessor. The accessor movement must be slow to prevent a serious collision while the accessor is moving "blind". Therefore there is a need for accurate real time accessor position information.

Large automated data storage libraries usually have one or more data storage drives that are contained within drive canisters within the library frames. If a customer needs more data storage drives, then additional drive canisters may be added. It is often necessary to obtain quick and accurate location information for each drive canister located in an automated data storage library. Prior art methods for locating drive canisters in automated data storage libraries used dip switches or jumpers to identify drive canisters. Other prior art methods have the data storage drives connecting by a unique cable (one per drive) to enable the automated data storage library to identify data storage drives. Cables are bulky, mistakes occur when the drives and cables are misconnected and drive failover is complicated because of the unique communication path to each drive. Therefore there is a need for accurate drive canister location information.

Generally a Global Positioning System (GPS) provides an accurate time source with four atomic clocks in each GPS satellite. It also provides accurate ranging information. The ranging information can be used for relative and absolute positioning measurements, as well as attitude (roll, pitch and yaw) measurements. Sub-millimeter accuracy can be obtained with the GPS system.

In order to benefit from a very large wireless telephone market, GPS manufactures have been working on techniques to improve the indoor characteristics of GPS receivers. One approach that has shown remarkable success is a design that uses massively parallel correlators. This can improve the effective receiver sensitivity to about −158 dBm. Another approach uses a technique called A-GPS (Assisted GPS) which receives the GPS data stream from an additional source, such as a cellular telephone network. This improves indoor operation reduces the time to determining a position from seconds or minutes, to hundreds of milliseconds. In one product example, Motorola manufactures an OEM GPS sensor, called "FS Oncore" with an approximate size of 200 square millimeters. This is a complete GPS solution that only requires an antenna and a serial interface to receive location and time information. Another Motorola product called "Instant GPS", is a single chip GPS receiver that is manufactured by IBM. This device requires minimum additional circuitry and Motorola provides reference designs for easy integration into products. In addition to the electrical integration, this solution only requires an antenna and a serial interface to receive location and time information. This new generation of single chip GPS receivers results in the availability of a low power and compact GPS system. In another product example, Global Locate manufactures a two chip GPS solution that requires a relatively small amount of electrical integration to operate in a product.

An automated data storage library typically comprises one or more controllers to direct the operation of the library. The controller may take many different forms and may comprise an embedded system, a distributed control system, a personal computer, workstation, etc. FIG. 1 shows a typical library controller 100 with a processor 102, RAM (Random Access Memory) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise an off the shelf microprocessor, custom processor, FPGA (Field Programmable Gate Array), ASIC (Application Specific Integrated Circuit), discrete logic, etc. The RAM (Random Access Memory) 103 is typically used to hold variable data, stack data, executable instructions, etc. The nonvolatile memory 104 may comprise any type of nonvolatile memory such as EEPROM (Electrically Erasable Programmable Read Only Memory), flash PROM (Programmable Read Only Memory), battery backup RAM, hard disk drive, etc. The nonvolatile memory 104 is typically used to hold the executable firmware and any nonvolatile data. The I/O interface 105 comprises a communication interface that allows the processor 102 to communicate with devices external to the controller. Examples of I/O interface 105 may comprise serial interfaces such as RS-232 or USB (Universal Serial Bus), SCSI (Small Computer Systems Interface), Fibre Channel, etc. In addition, I/O interface 105 may comprise a wireless interface such as RF or Infrared. The device specific circuits 101 provide additional hardware to enable the controller 100 to perform unique functions such as motor control of a cartridge gripper, etc. The device specific circuits 101 may comprise electronics that provide Pulse Width Modulation (PWM) control, Analog to Digital Conversion (ADC), Digital to Analog Conversion (DAC), etc. In addition, all or part of the device specific circuits 101 may reside outside the controller 100.

FIG. 2 illustrates an automated data storage library 10 with left hand service bay 13, one or more storage frames 11, and right hand service bay 14. As will be discussed, a frame may comprise an expansion component of the library. Frames may be added or removed to expand or reduce the size and/or functionality of the library. Frames may comprise storage shelves, drives, import/export stations, accessors, operator panels, etc. FIG. 3 shows an example of a storage frame 11, which also is the minimum configuration of the library 10 in FIG. 2. In this minimum configuration, there is no redundant accessor or service bay. The library is arranged for accessing data storage media (not shown) in response to commands from at least one external host system (not shown), and comprises a plurality of storage shelves 16, on front wall 17 and rear wall 19, for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18. As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or reading system, such as a smart card reader or similar system, mounted on the gripper 20, to "read" identifying information about the data storage media.

SUMMARY OF THE INVENTION

It is an object of the present invention to provide for improved location information in an automated data storage library by use of a locating device such as a GPS (Global Positioning System) receiver and/or A-GPS (Assisted GPS) receiver.

Disclosed are a system, a method, and an article of manufacture for the use of global positioning system location information in an automated data storage library.

In a first embodiment a GPS antenna is coupled to an automated data storage library to enable quick and accurate location information to be obtained for the automated data storage library. The location information is transmitted to a receiving location where the location information may be used to identify the precise location of the automated data storage library. The location information may be used in the event the automated data storage library needs to be located for service, upgrade, maintenance, etc. The location information may be transmitted to the receiving location during an automated "Call-Home" or "Heartbeat Call-Home" connection to a service or repair center. Multiple automated data storage libraries may transmit location information to one or more receiving locations. The location information for multiple automated data storage libraries may then be used to identify groups or clusters of automated data storage libraries.

In a second embodiment, GPS antennas are coupled to one or more library frames in an automated data storage library to enable quick and accurate location information to be obtained for each frame. This is an advantage over prior art methods for locating frames in automated data storage libraries and is important to provide improved operation when automated data storage libraries are configured. In addition, this embodiment may be combined with prior art methods to provide an alternative approach that results in improved redundancy. Large automated data storage libraries usually comprise modules or frames that allow the size of the library to be controlled by the number of frames that are attached to the library. If a customer needs more drives and/or storage, then additional frames are added. These frames may comprise a controller to provide additional functionality, or processing capability, as the size of the library increases. By use of the present invention, the library controller may configure the automated data storage library using the precise location information for each library frame available from the GPS location information. For example, a frame controller may require information about its location within the library. This may be required for addressing the frame controller in a communication network.

In a third embodiment, GPS antennas are coupled to one or more accessors in the automated data storage library to enable quick and accurate location information for each accessor. For example, a library may be powered off with the accessor located anywhere within the library. When the library is powered on, the library controller could determine the location of the accessor, resulting in a rapid movement to a home position or it could eliminate the need for a home position sensor. In another example, this embodiment may be used to control the basic motion of the accessor such that other feedback mechanisms may be eliminated. This is an advantage over prior art methods for locating accessors in automated data storage libraries and is important to provide improved control of the accessors. In addition, this embodiment may be combined with prior art methods to provide an alternative approach that results in improved redundancy by providing an additional sensor for accessor location.

In a fourth embodiment a drive canister GPS antenna is coupled to one or more drive canisters in the automated data storage library. This provides an improvement over the prior art method of having the drives connecting by a unique cable (one per drive) to enable identification of drives by the library controller. With a GPS receiver in each drive canister, the automated data storage library can determine which data storage drive is communicating on a common bus because the location of the data storage drive is known within the automated data storage library. This embodiment allows the library to use an automated addressing scheme that's based on the physical location of the drive. This is important because the library needs to know where (physically) to load and unload the cartridges and it needs to know which drive it is communicating with.

For a more detailed understanding of the present invention, reference may be made to the following detailed description taken in conjunction with the accompanying drawings.

BRIEF DESCRIPTION OF THE DRAWINGS

FIG. 7 is a flow chart showing the method of the first embodiment of the present invention.

FIG. 8 is a flow chart showing the method of the second embodiment of the present invention.

DETAILED DESCRIPTION OF THE PREFERRED EMBODIMENTS

This invention is described in preferred embodiments in the following description. The preferred embodiments are described with reference to the Figures. While this invention is described in conjunction with the preferred embodiments, it will be appreciated by those skilled in the art that it is intended to cover alternatives, modifications, and equivalents as may be included within the spirit and scope of the invention as defined by the appended claims.

Figure 2:
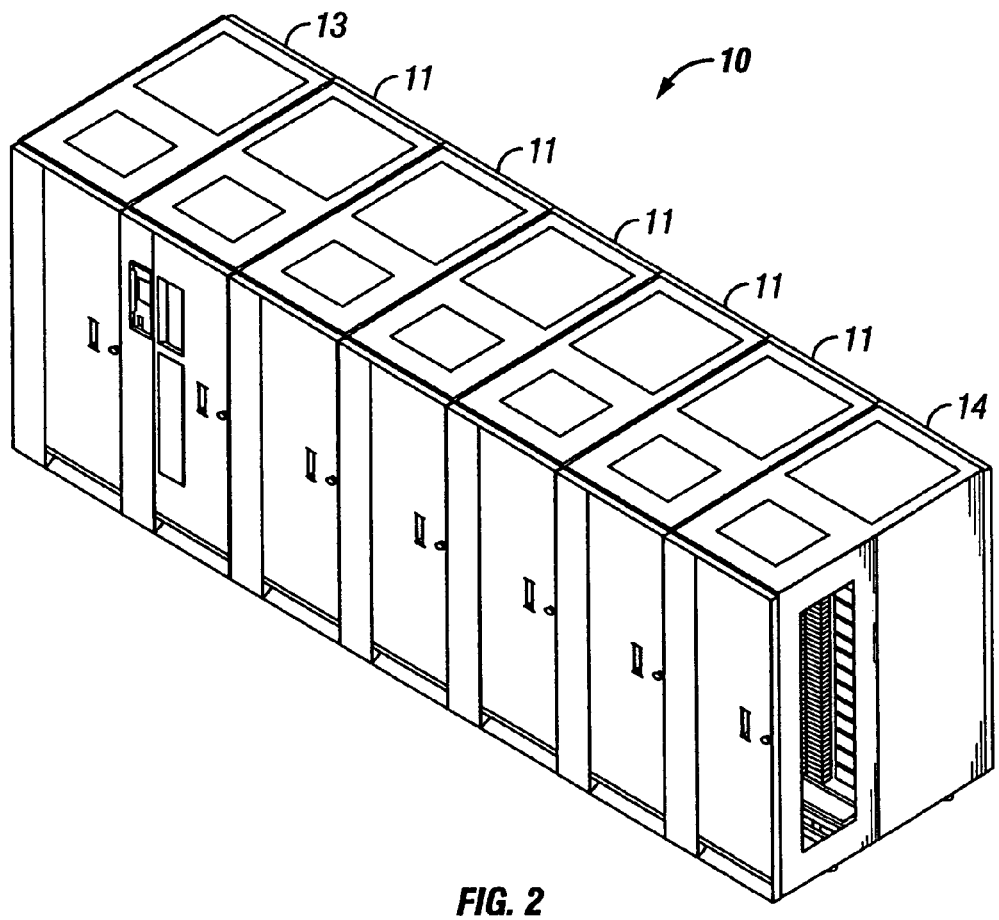
FIG. 2 illustrates an automated data storage library comprising a left hand service bay, multiple storage frames and a right hand service bay.
Figure 3:
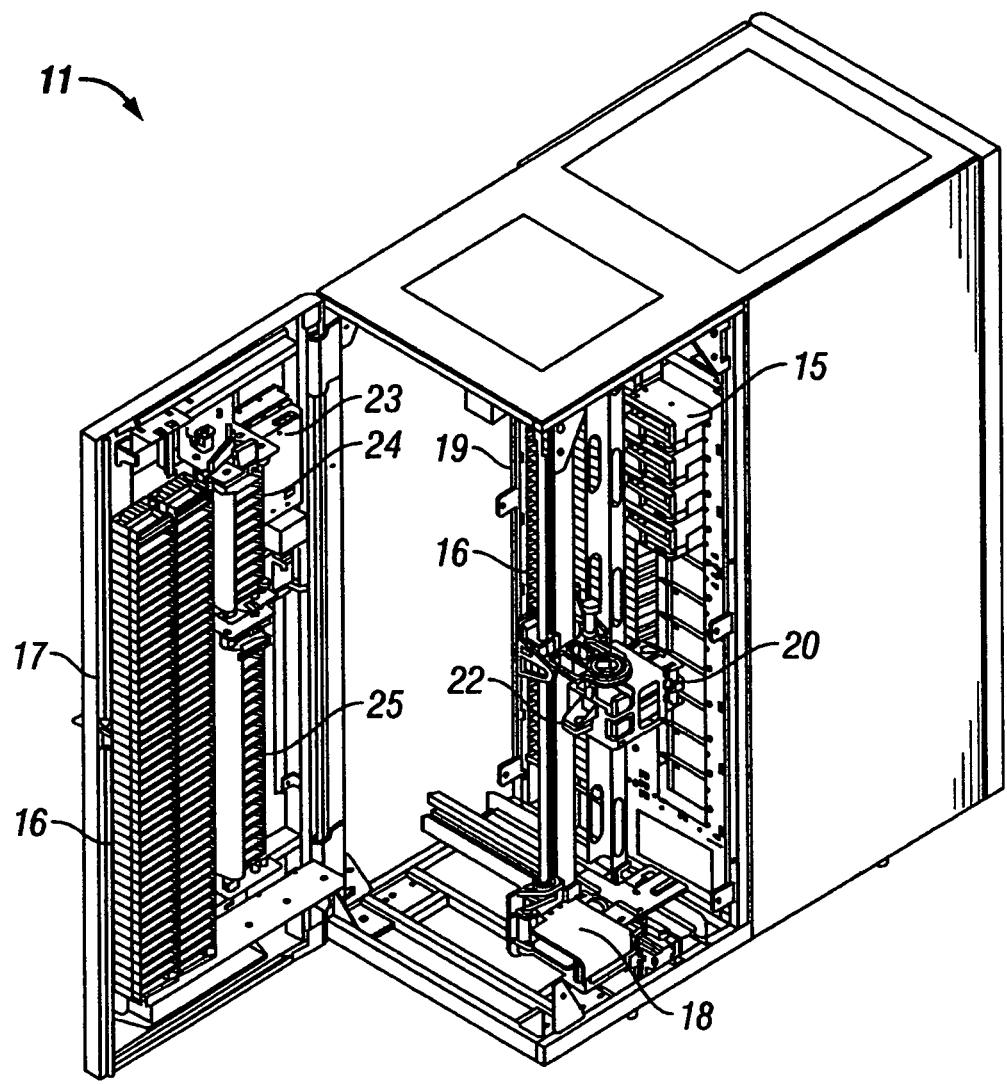
FIG. 3 illustrates a configuration of the automated data storage library of FIG. 2.
Figure 4:
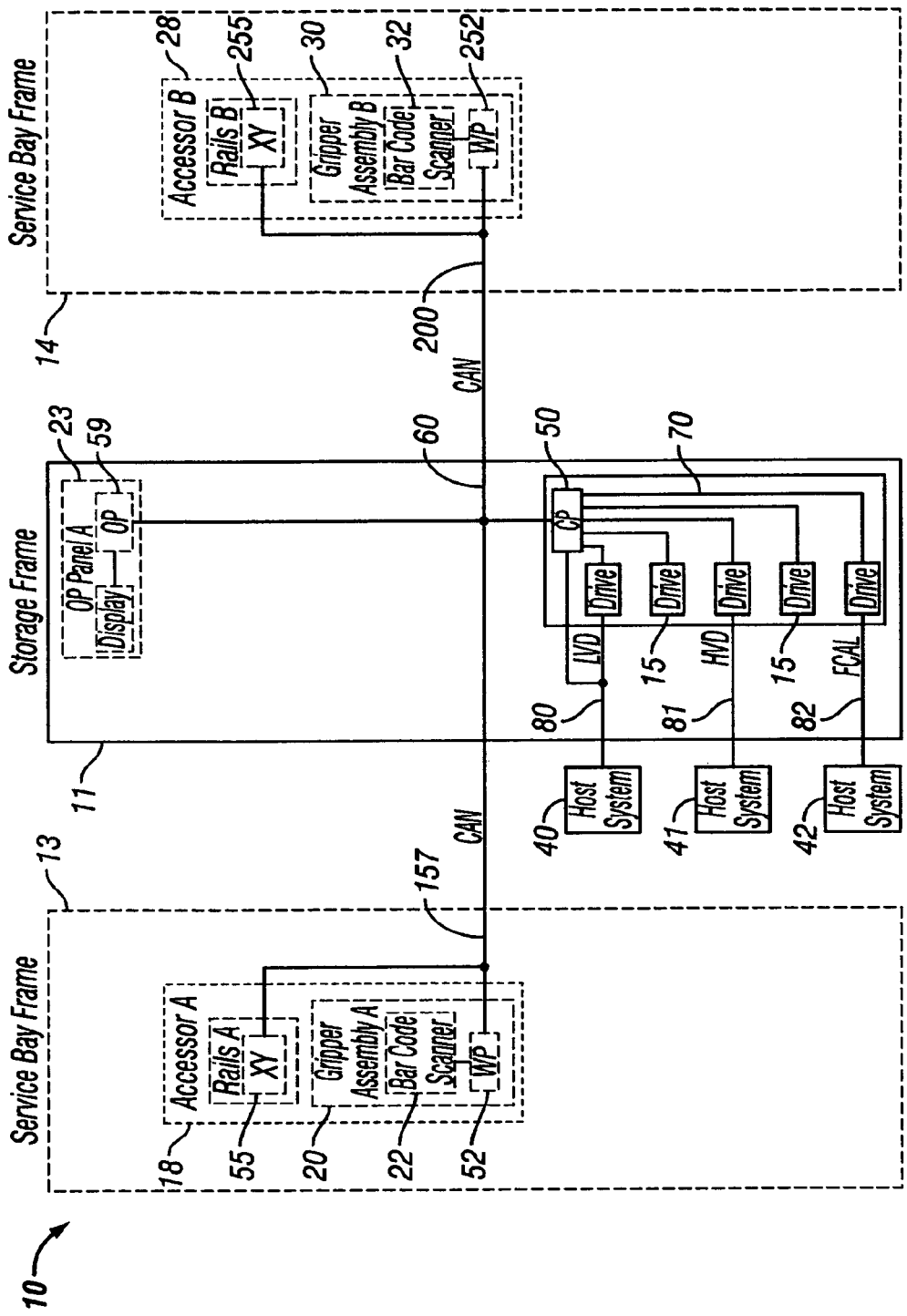
FIG. 4 illustrates an embodiment of an automated data storage library which employs a distributed system of processor nodes.

FIG. 4 illustrates an embodiment of an automated data storage library 10 of FIGS. 2 and 3, which employs a distributed system of modules with a plurality of processor nodes. An example of an automated data storage library which may implement the present invention is the IBM 3584 UltraScalable Tape Library. For a fuller understanding of a distributed control system incorporated in an automated data storage library, refer to U.S. Pat. No. 6,356,806 titled "Automated Data Storage Library Distributed Control System" which is incorporated herein for reference. While the library 10 has been described as a distributed control system, this invention applies equally to libraries that incorporate other control configurations such as one or more library controllers that are not distributed. The library of FIG. 4 comprises one or more storage frames 11, a left hand service bay 13 and a right hand service bay 14.

The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14. In addition, the present invention may operate with fewer or more than two accessors.

In the exemplary library, first accessor 18 and second accessor 28 moves their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18 and that is coupled to the communication processor node 50 via a network 60, 157. A second work processor node 252 that may be located at second accessor 28 and that is coupled to the communication processor node 50 via a network 60, 200 may also be provided. Each work processor node may respond to received commands that are broadcast to the work processor nodes from any communication processor node, and the work processor node may also direct the operation of first accessor 18, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor node 52, and the XY processor node 55.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the host(s) and with the data storage drives. In the example of FIG. 4, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, the automated data storage library 10 may additionally comprise a second accessor 28, for example, shown in a right hand service bay 14 of FIG. 4. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 4 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 5:
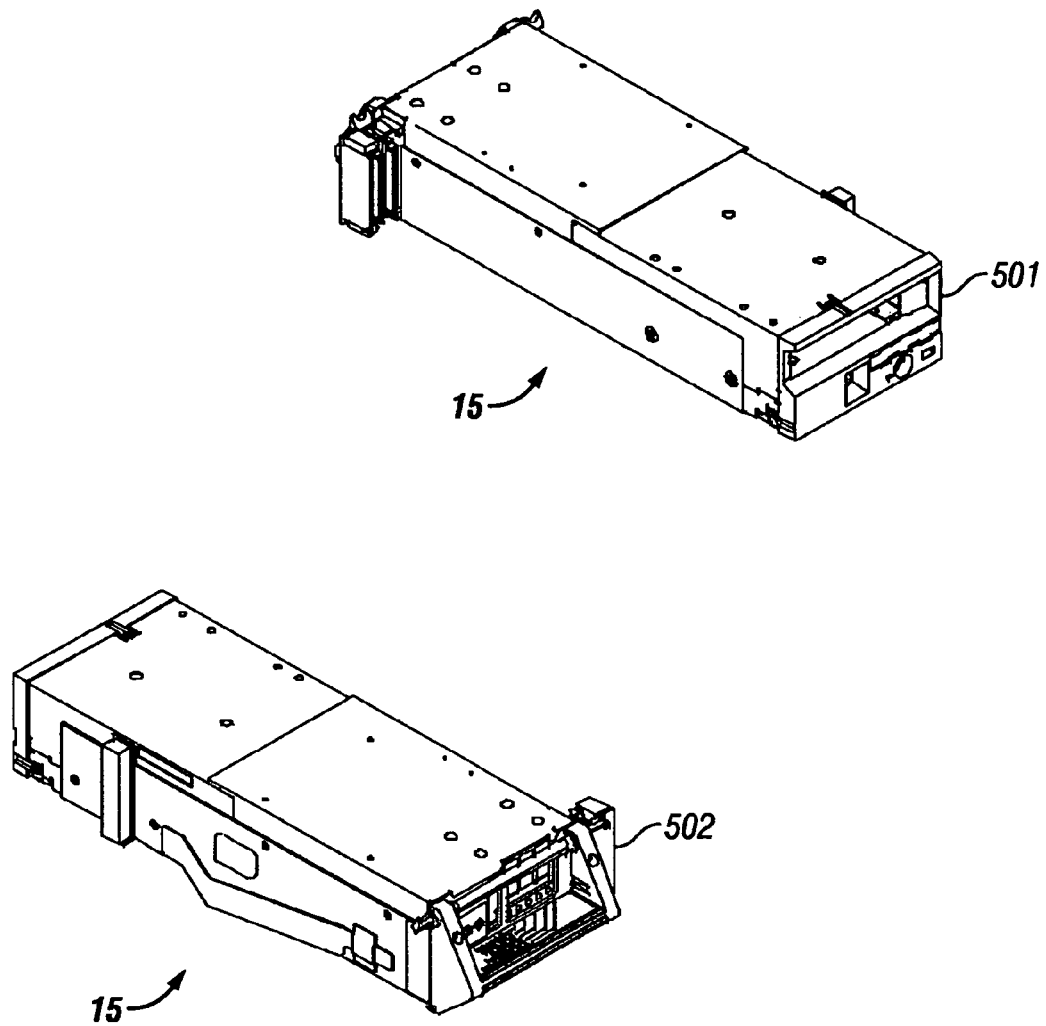
FIG. 5 illustrates a front and rear view of a data storage drive mounted in a drive canister.

FIG. 5 shows a view of the front 501 and rear 502 of drive 15. In this example, drive 15 is a removable media LTO (Linear Tape Open) tape drive mounted in a drive canister. The drive canister may comprise a housing to hold drive 15, mounting means to attach drive 15 to the drive canister, electrical components, interface cables, interface connectors, etc. The data storage drive of this invention may comprise any removable media drive such as magnetic or optical tape drives, magnetic or optical disk drives, electronic media drives, or any other removable media drive as is known in the art.

Figure 1:
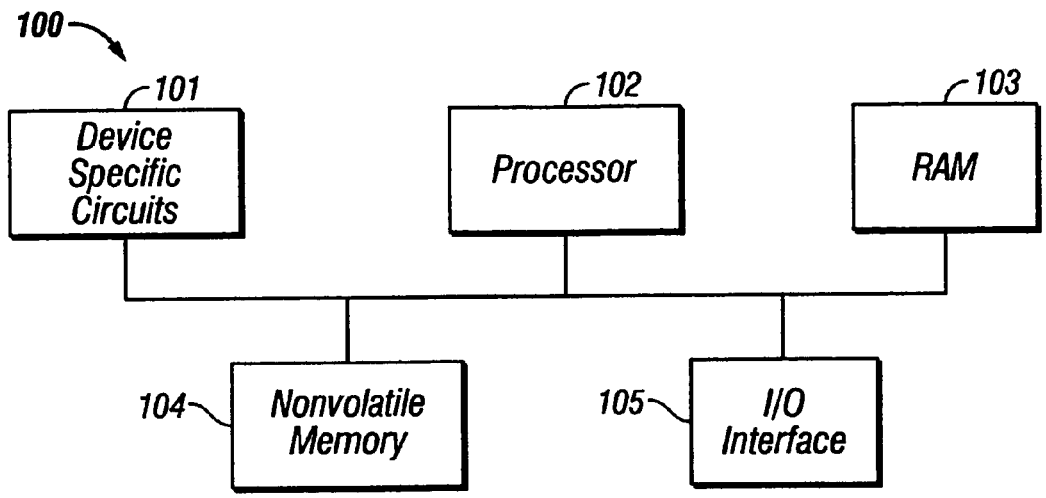
FIG. 1 is a block diagram of a library controller which may implement the method of the present invention.
Figure 6A:
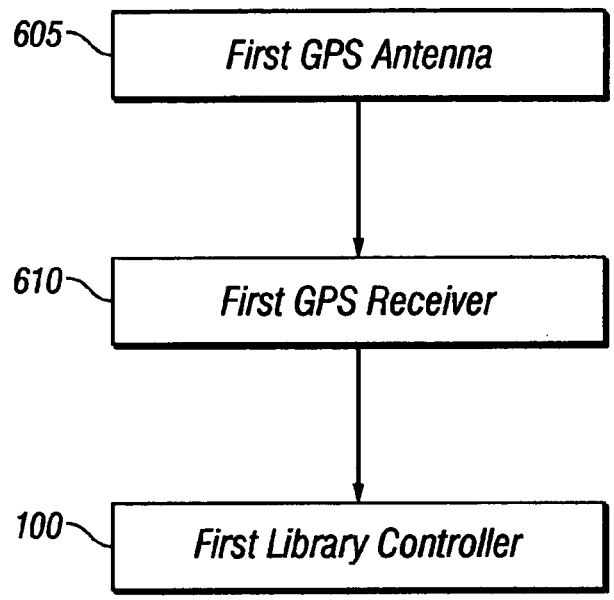
FIGS. 6A, 6B and 6C show block diagrams of systems configured with GPS antennas and receivers in an automated data storage library.
Figure 6B:
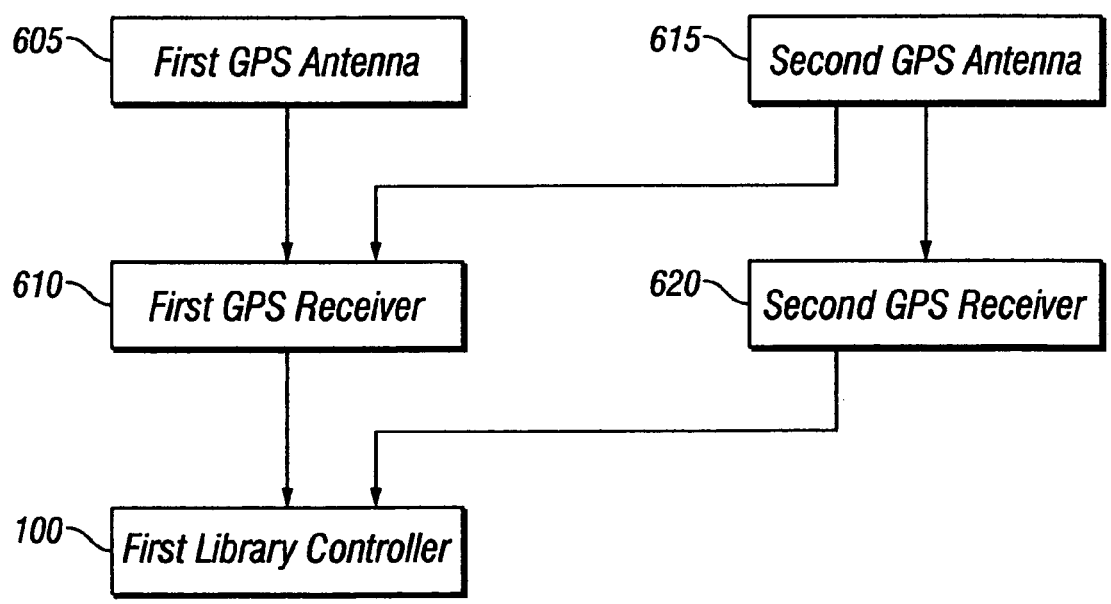
Figure 6C:
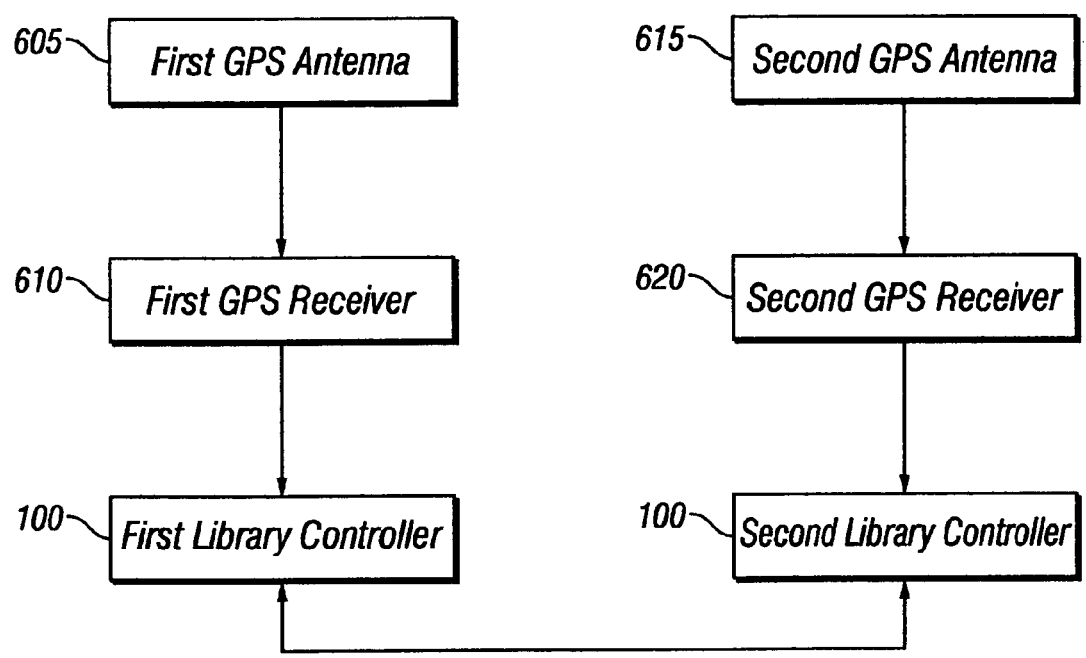

FIG. 6A shows a block diagram of a connection of a GPS system that may be used for the present invention. First GPS antenna 605 is coupled to first GPS receiver 610. First GPS receiver 610 is coupled to first library controller 100. Library controller 100 may comprise a dedicated controller of a prior art library or it may comprise a processor node of a distributed control library, such as the library of FIG. 4. For example, communication processor node 50, work processor node 52, XY processor node 55, etc. In addition, library controller 100 may comprise more than one processor node, such as a distributed control library that employs multiple processor nodes to accomplish library functionality. Herein, library controller may comprise a single controller or multiple controllers. FIG. 6B shows a block diagram of an alternative connection of a GPS system that may be used for the present invention. First GPS antenna 605 is coupled to first GPS receiver 610. First GPS receiver 610 is coupled to first library controller 100. Second GPS antenna 615 may be coupled to either first GPS receiver 610 or to optional second GPS receiver 620. If present, second GPS receiver 620 is coupled to first library controller 100. Library controller 100 may comprise a dedicated controller of a prior art library or it may comprise one or more processor nodes of a distributed control library, such as the library of FIG. 4. FIG. 6C shows a block diagram of another alternative connection of a GPS system that may be used for the present invention. First GPS antenna 605 is coupled to first GPS receiver 610. First GPS receiver 610 is coupled to first library controller 100. First library controller 100 may comprise a dedicated controller of a prior art library or it may comprise one or more processor nodes of a distributed control library, such as the library of FIG. 4. Second GPS antenna 615 is coupled to second GPS receiver 620. Second GPS receiver 620 is coupled to second library controller 100. Second library controller 100 may comprise a dedicated controller of a prior art library or it may comprise one or more processor nodes of a distributed control library, such as the library of FIG. 4. In FIGS. 6B and 6C, there may be more than two GPS antennas 605, 615 and/or there may be more than two GPS receivers 610, 620. In addition, there may be more than two library controllers 100. The library may comprise standard GPS receivers or A-GPS (Assisted GPS) receivers for first GPS receiver 610 and/or second GPS receiver 620. First GPS receiver 610 and second GPS receiver 620 may comprise a complete packaged GPS solution, an OEM GPS sensor, a GPS chip set, custom integrated circuits, discrete components, or combinations thereof. For example, the Motorola OEM GPS sensor, called "FS Oncore" with an approximates size of 200 square millimeters described above may be used. First GPS receiver 610 and second GPS receiver 620 may provide absolute and/or relative location information or they may provide information to allow library controller 100 to calculate relative or absolute location information. FIGS. 6A, 6B and 6C show examples of systems to use GPS antennas and receivers. It will be appreciated by those skilled in the art that this invention in not limited to the combinations shown in FIGS. 6A-6C and other combinations, modifications or adaptations may be made without departing from the scope of the present invention. Although the invention will be described using the Global Positioning System (GPS), any wireless system for obtaining relative or absolute location information may be used. For example, other satellite based navigation systems may be used, other radio triangulation techniques with other radio sources may be used, combinations thereof, etc. Herein, GPS refers to any wireless system for obtaining relative or absolute location information. One example of a GPS system that may be used with the present invention is the Instant GPS from Motorola. This is a single chip GPS device that measures 7 mm by 7 mm and requires very little in the way of additional electrical components. A passive or active antenna may be used with the device and a serial interface is used to provide position and timing information to a coupled controller. In the present invention, the coupled controller may comprise controller 100 (FIG. 1). In a distributed control library which comprises more than one controller 100, such as the library 10 of FIG. 4, the coupled controller may comprise any controller. For example, the coupled controller may comprise communication processor node 50 (FIG. 4), work processor node 52 (FIG. 4), combinations thereof, etc.

In the first embodiment of the present invention a GPS antenna is attached to automated data storage library 10 to enable quick and accurate location information for automated data storage library 10. This is an advantage over prior art methods for locating automated data storage libraries and is important because automated data storage libraries are usually very expensive and tend to be used in critical roles. For example, customers use automated data storage libraries to back up critical data. If the automated data storage library fails then the customer is exposed with no backup. Other customers use automated data storage libraries for real-time data retrieval and if the automated data storage library fails in this application, the customer has no access to their data. Therefore, quick service and repair is vital for large and expensive automated data storage libraries. A feature often referred to as "Call-Home" is used to expedite service and repair of an automated data storage library. Call-Home is a feature where the library will call a service or repair center when it detects an operational error. Another feature, called "Heartbeat Call-Home" involves a periodic call to a service or repair center as a watchdog function. If the automated data storage library doesn't call at some periodic interval then it may be an indication that there is a problem with the automated data storage library. The physical location is needed to locate the automated data storage library for service or repair. The communication between a product that provides the Call-Home capability and a service or repair facility may comprise telephone lines, the Internet, an Intranet, a wireless link such as RF or Infrared, dedicated communication lines such as Fibre Channel or ISDN, or any other means of communication between two remote devices as is known to those of skill in the art. In addition, the automated data storage library may comprise communication to another product that actually provides the connection to the service or repair facility. In prior art systems, the physical location of the automated data storage library may be entered manually by an operator or a service technician. This involves human intervention and may be prone to error. For example, the location information may never be entered, it may be entered inaccurately, or may be entered with insufficient details. In addition, the automated data storage library could be moved and the location information may not be correctly updated. This may result in a critical error that doesn't get serviced in a timely manner because the repair technician couldn't locate the failing library. By use of the present invention the precise location of automated data storage library 10 is obtained from a GPS receiver and the associated GPS antenna attached to automated data storage library 10 or components thereof.

The method of the first embodiment can be better understood by referring to flowchart 700 shown in FIG. 7 and the block diagrams shown in FIGS. 6A-6C. At step 705 a first GPS antenna 605 is attached to the library. The library may be the automated data storage library 10 shown in FIG. 2 or other configurations or embodiments of data storage libraries. First GPS antenna 605 may be attached to automated data storage library 10 at the time the library is manufactured, assembled, modified or upgraded either at the factory, customer location or other location. First GPS antenna 605 may be attached anywhere on, or in, the library. Alternatively, attachment to automated data storage library 10 may comprise first GPS antenna 605 being separate from and coupled to the library. For example, better reception may be obtained by locating first GPS antenna 605 at some other location other than on, or in, the library. At step 710, first GPS antenna 605 is coupled to first GPS receiver 610 to enable first GPS receiver 610 to receive GPS signals from first GPS antenna 605. Alternatively, first GPS receiver 610 may comprise an integrated antenna. At step 715 first GPS receiver 610 is coupled to library controller 100 to enable library controller 100 to receive information, derived from the GPS signal, from first GPS receiver 610. The information may be received through a communication interface, such as RS-232, USB (Universal Serial Bus), etc. Alternatively, the information may be received through a wireless communication interface such as RF or Infrared. Additionally, the information may be received through a direct hardwired connection comprising a register interface, for example. For a direct hardwired connection, the interface may comprise address and data lines as are used to interface memory components with microprocessors. At step 720 first GPS receiver 610 provides information, derived from first GPS signal, to library controller 100. Library controller 100 receives the information from first GPS receiver 610 and obtains location information identifying the precise location of first GPS antenna 605. The location information obtained may comprise absolute or relative location information. For example, the location information may comprise coordinates in the Latitude/Longitude coordinate system and may identify the physical location of automated data storage library 10. In another example, the location information may provide positional information relative to some other location or reference. Alternatively, at step 720, first GPS receiver 610 may provide location information to library controller 100 that allows library controller 100 to calculate the precise location of the first GPS antenna 605. For example, some GPS solutions may provide raw ranging or timing data and the coupled controller may perform the necessary calculations to provide the precise location. At step 725 library controller 100 transmits location information to a receiving location. This information may be transmitted using any communication interface described above for Call-Home. For example, a receiving location may comprise a call-home facility and the library comprises a modem. The modem is connected to a telephone line and the library uses the modem to dial the telephone number of a public or private network. After authenticating the library access to the network, a network connection to a remote computer at the call-home facility is established to transfer information to/from the library. In this example, the library may transfer error logs to the remote computer. The error logs may contain information about a failing component, such as the component part number. A repair technician can use this information to arrive at the customer site with a replacement component in hand. Once received, the location information may be used to physically locate the automated data storage library 10 or to locate other configurations or embodiments of data storage libraries that have one or more GPS antennas attached. The location information could be made available to the customer or an agent of the customer to locate equipment during audits, after an error, or anytime the customer requires information about where their equipment is located. The information may be provided through a management interface, such as SNMP (Simple Network Management Protocol), a web user interface, an operator panel, etc. The location information may be used by a service technician, or anyone else, to locate the current position of automated data storage library 10. The location information could be used in conjunction with a portable GPS receiver to locate the current position of automated data storage library 10. For example, a service technician may use a portable GPS receiver to find the customer building and the room that automated data storage library 10 is located in. Because the physical location of automated data storage library 10 is determined, the location information may be used to locate automated data storage library 10 on a street map, computer generated street map or other map device. The service or repair center that receives the location information could produce a map or directions to locate the automated data storage library. For example, the location information in the form of coordinates, street address, etc. may be entered into a personal computer. Software in the personal computer could produce a list of directions to locate automated data storage library 10 from a given starting point. The list of directions may comprise for example of series of turns to be executed and distances to traverse after each turn with the result of arriving at the location of automated data storage library 10. This capability could also be provided to the customer or to an agent of the customer. In addition, this capability could be provided through a web server, remote computer, or even by the automated data storage library itself.

Library controller 100 may be programmed to periodically transmit location information to a receiving location. For example, the "Call-Home" feature described above may be used to transmit the location information to a receiving location, and therefore expedite service and repair of an automated data storage library or to periodically update information (for example the physical location of automated data storage library 10) at the receiving location. Another feature, called "Heartbeat Call-Home" also described above involves a periodic call to a service or repair center as a watchdog function, and may also used to periodically update information at the receiving location. If the library doesn't call at some periodic interval then it may be an indication that something has gone wrong with the library. The periodic interval may comprise a range of seconds to several months or more. In the event of a failure, the receiving location would have previous data identifying the location of the automated data storage library that was obtained from a previous "Heartbeat Call-Home" event. The previous data identifying the location of the automated data storage library could then be used in the event of a missing "Heartbeat Call-Home" to expedite the timely location and repair of the automated data storage library.

Multiple automated data storage libraries may transmit location information to one or more receiving locations. The location information of multiple automated data storage libraries may then be used to identify groups or clusters of automated data storage libraries. The present invention enables identifying geographic locations of groups of a plurality of automated data storage libraries. This data identifying geographic locations of groups automated data storage libraries may be used to track installations of automated data storage libraries to determine sales and marketing information, to establish a correct balance of repair skills, etc. For example, a geographic region that contains a high concentration of a certain model library may require additional staffing and may indicate a need for more specialized training.

In a second embodiment, GPS antennas are attached to one or more library frames in automated data storage library 10 to enable quick and accurate location information for each frame located in automated data storage library 10. For example, a frame number scheme can be established by determining the location of a frame relative to the location of another frame or library component. This embodiment provides an advantage over prior art methods for locating frames in automated data storage libraries and is important to provide improved operation when automated data storage libraries are configured. For example, large automated data storage libraries usually comprise modules or frames that allow the size of the library to be controlled by the number of frames that are attached to the library. If a customer needs more storage, then additional frames are added. In a distributed control system, such as described in U.S. Pat. No. 6,356,803 titled "Automated Data Storage Library Distributed Control System", the frame controller may require location information identifying the frame that the frame controller is located in.

One approach is the use of dip switches or jumpers to identify the frame that the frame controller is located in. The problem with this approach is that it involves operator intervention and may be prone to error. For example, an operator may incorrectly set the jumpers or switches. In addition, if the frame controller is swapped or replaced then there is additional opportunity for operator error because a repair technician may forget to change the jumpers or switches. Another approach is the use an automated frame counting circuit such as the one described in patent application number US20020169903A1 titled "Automatic Frame Identification, Door Status, and Frame Count Detection System". The problem with this approach is that it involves additional cabling and connectors. Cables and connections require human intervention and may be prone to error. For example, an operator may incorrectly plug the cables, a pin may become pushed, a cable may be intermittent, etc. In addition, if the frame controller is swapped or replaced then there is additional opportunity for connector failure or operator error because a repair technician may forget to plug the cables or may plug them incorrectly. By use of the present invention the precise location of each frame in automated data storage library 10 may be obtained from a GPS receiver and the associated GPS antenna attached to each frame. This location information may be used to calculate the position of one frame relative to another frame or library component. This second embodiment may be combined with prior art solutions to provide a higher availability system through redundant components. For example, this second embodiment could be combined with the frame counting circuit described above. A failure of the frame counting circuit could result in the activation of this second embodiment to provide the necessary frame information to the library controller, providing redundancy so that no single component could prevent library operation.

The method of the second embodiment can be better understood by referring to flowchart 800 shown in FIG. 8 and the block diagrams shown in FIGS. 6B and 6C. At step 805 a frame GPS antenna is attached to one library frame. The library frame may be any frame in automated data storage library 10, for example, left hand service bay 13, one or more storage frames 11, or right hand service bay 14 in automated data storage library 10 shown in FIG. 2 or other configurations or embodiments of data storage libraries. The frame GPS antenna may comprise first GPS antenna 605 or second GPS antenna 615. The frame GPS antenna may be attached to the library at the time the library is manufactured, assembled, modified or upgraded either at the factory, customer location or other location. The frame GPS antenna may be attached anywhere on the library frame. Attaching the antenna to the library frame may comprise physical attachment to the library frame, locating within proximity of the library frame or coupling to the library frame. In a preferred embodiment each frame GPS antenna is located at a fixed location on each library frame to enable leveling of library frames (explained below). At step 810, the frame GPS antenna is coupled to first GPS receiver 610 to enable first GPS receiver 610 to receive GPS signals from the frame GPS antenna. Alternatively the frame GPS antenna may be coupled to second GPS receiver 620. Second GPS receiver 620, receives a second GPS signal and Library controller 100 receives information from second GPS receiver. The second information is derived from the second GPS signal and the second information identifies the location of a storage frame in automated data storage library 10. In FIG. 6B, first GPS receiver 610 and second GPS receiver 620 are coupled to library controller 100. In FIG. 6C, first GPS receiver 610 is coupled to library controller 100 while second GPS receiver is coupled to second library controller 100. The decision to couple each GPS receiver to separate library controllers is a design preference. For example, a single library controller may be coupled to multiple GPS receivers (as shown in FIG. 6B) or it may be coupled to a single GPS receiver that may be coupled to multiple antennas (also shown in FIG. 6B). In another example, a library that comprises more than one controller, such as the distributed control library of FIG. 4, may be designed to couple each GPS receiver to a different library controller (FIG. 6C). Still further, the design may comprise combinations thereof. Library controller 100 receives information from first GPS receiver 610 and second GPS receiver 620 and obtains location information to identify the location of the frame GPS antenna at step 815, and therefore determine the position or frame number of the library frame in automated data storage library 10. At step 820 additional frame GPS antennas are attached to one or more library frames in automated data storage library 10 or they are attached to other configurations or embodiments of data storage libraries. At step 825, library controller 100 may use the location information from each frame GPS antenna to identify the position or frame number of each frame.

The position or frame number information for each frame may be used by library controller 100 for many different purposes. For example, the physical position of each library frame may be used by library controller 100 during assembly or reconfiguration of automated data storage library 10 to enable library controller 100 to automatically configure the library to operate with the current configuration of library frames. In this case, the position or frame number may be used by the frame controller to determine a communication address of each frame controller such that a frame controller address on a communication bus may be related to a frame number in the library. The physical position of each library frame may be used by library controller 100 or other device during assembly of automated data storage library 10 to enable leveling of the library frames. This capability may be used when it is necessary to attach a frame to an existing library frame, or when it is necessary to move the entire library. Attaching or moving library frames normally involves levels or plumb bobs to ensure that each frame is aligned with the preceding frames and that each frame is level. Depending on the library design, this may be a tedious and time consuming operation. This process may be simplified by using GPS to determine the physical position and orientation of the library frame. The location coordinates of the added library frame may be first computed from the location coordinates of the existing library frame. The added library frame may then be moved to precisely align the added frame to the existing frame. For each storage frame added, the position of the storage frame is adjusted to physically align each storage frame to automated data storage library 10. The movement of the frame may be accomplished manually, for example, with jacks or blocks, or alternatively it may be moved by an electronically controlled motor driven movement device. The electronically controlled motor driven movement device may be coupled to library controller 100, or it may be coupled to another device, to automatically move the added library frame while processing the location information derived from the frame GPS antennas.

In a third embodiment, additional GPS antennas are attached to one or more accessors in automated data storage library 10 to obtain location information for each accessor located in automated data storage library 10. The accessor location information may comprise coordinates in the Latitude/Longitude coordinate system and may identify the physical location of one or more accessors in automated data storage library 10 or the accessor location information may provide positional information relative to some other location or reference. The accessor location information for each accessor may be used by a library controller for many different purposes. For example, the physical position of each accessor may be used by library controller 100 during assembly or reconfiguration of automated data storage library 10 to enable library controller 100 to automatically configure the library to operate with the current configuration of library frames. As more library frames are added to automated data storage library 10, automatic calibration procedures may use the real time position information available for each accessor to enable the accessor to accurately access the new library frames. The accessor location information may be used by the library controller to determine where the accessor is located within the library after a power-up, reset, or library door open/close. The accessor location information allows the library controller to move the accessor to a home position much faster than prior art techniques. For example, after a library power-up of prior art systems, the accessor may be located away from its home position. The library controller cannot determine the actual location of the accessor until the accessor has reached a home position or calibration location. The library controller must move the accessor at a very slow speed to avoid collisions while running "blind". By use of the present invention, the library controller could determine the location of the accessor, resulting in a rapid movement to a home position or to eliminate the need to use the home position as the only precise reference location. The accessor location information may be used for collision avoidance in a multi-accessor library. For example, in the distributed control library of FIG. 4, work processor 52 of the first accessor 18 and/or work processor 252 of the second accessor 28 could use the accessor location information to avoid an accessor collision. The accessor location information may also be used to position the accessor while moving media to/from drives and storage slots. This eliminates the motor tachometers of prior art solutions and allows the location to be quickly determined, even after a power reset. This third embodiment may be combined with prior art techniques to provide a system with higher availability.

Figure 9:
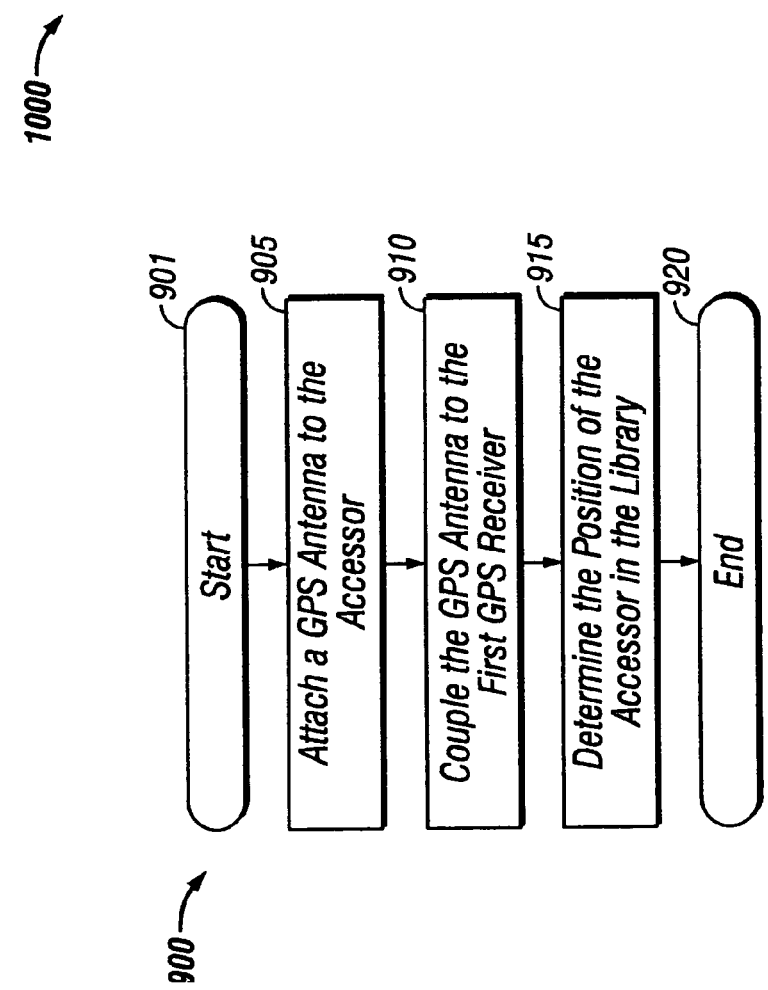
FIG. 9 is a flow chart showing the method of the third embodiment of the present invention.

The method of a third embodiment can be better understood by referring to flowchart 900 shown in FIG. 9 and the block diagram shown in FIGS. 6B, 6C. In addition, this embodiment will be described in terms of the dual accessor distributed control library of FIG. 4. One skilled in the art having the benefit of this application will recognize that this embodiment is not limited to a dual accessor library or to a distributed control system and may be applied equally to a library that only comprises a single controller and/or a single accessor. At step 905 first GPS antenna 605 is attached to first accessor 18 in automated data storage library 10. In the case of a dual accessor library, second GPS antenna 615 is attached to second accessor 28. First GPS antenna 605 is coupled to first GPS receiver 610 at step 910 to enable first GPS receiver 610 to receive GPS signals. First GPS receiver 610 is coupled to work processor controller 52 on first accessor 18. In the case of a dual accessor library, second GPS antenna 615 is coupled to second GPS receiver 620 to enable second GPS receiver 620 to receive GPS signals. Second GPS receiver 620 is coupled to work processor controller 252 on second accessor 28. The GPS antenna(s) may be attached to the accessor(s) at the time the library is manufactured, assembled, modified or upgraded either at the factory, customer location, or other location. The GPS antenna(s) may be attached anywhere on the accessor(s). Attaching the antenna to the accessor(s) may comprise physical attachment to the accessor(s), locating within proximity of the accessor(s) or coupling to the accessor(s). In a preferred embodiment each GPS antenna is located at a fixed location on each accessor to enable alignment of the accessors. At step 915 first GPS receiver 610 provides accessor location information to work processor node 52, to enable work processor node 52 to identify the precise location of first accessor 18. In the case of a dual accessor library, second GPS receiver 620 provides accessor location information to work processor node 252, to enable work processor node 252 to identify the precise location of second accessor 28. Providing accessor location information derived from the GPS signal to work processor node(s) 52, 252 is equivalent to providing accessor location information to the library controller 100. In the distributed control library of FIG. 4, library controller 100 may comprise any processor node such as work processor node 52, work processor node 252, communication processor node 50, etc. In addition, library controller 100 may comprise combinations of processor nodes, such as work processor node 52 and work processor node 252. Still further, library controller 100 may comprise all of the processor nodes. Library controller 100 may receive the accessor location information either directly from work processor node(s) 52, 252, other processor nodes, first GPS receiver 610, second GPS receiver 620 or other communication interfaces depending upon the configuration of the system. At step 915 the position of first accessor 18 and/or second accessor 28 may be determined by library controller 100 from accessor location information received by library controller 100. The accessor location information may be used to position the accessor while moving media to/from drives and storage slots. For example, the position of the accessor may be used as input to library controller 100 to determine the required movement of the accessor to move media, as is know in the art. In addition, the accessor location information may be used to avoid collisions or interference with another accessor or component. First GPS receiver 610 and second GPS receiver 620 may be located anywhere within the library. In addition, there may only be a single controller 52, 252 and there may only be a single GPS receiver 610, 620 as described above with reference to FIG. 6B.

In a fourth embodiment a drive canister GPS antenna is attached to one or more drives and/or drive canisters in automated data storage library 10. This allows an alternative method of addressing the drives and determining the position or location of each drive within the library 10 or storage frame 11. For example, the drives may be coupled to the library 10 through a common bus or other network. This provides an improvement over the prior art method of having the drives connecting by a unique cable (one per drive) to enable automated data storage library 10 to identify which drive is communicating with library controller 100. The elimination of the individual drive cables provides several advantages because the added cabling is bulky, mistakes may occur when the drives and cables are misconnected and drive failover is complicated because of the unique communication path to each drive in automated data storage library 10. By use of drive canister GPS antennas, dip switches or other mechanisms to identify each data storage drive are eliminated. Dip switches require human intervention which can be prone to error. In addition, if a drive is swapped or moved and the dip switches are not set correctly then an error will occur. With a GPS receiver providing drive canister location information for each drive or drive canister, automated data storage library 10 can determine which data storage drive is communicating on common bus because of the position or location of the data storage drive is known within automated data storage library 10. By providing drive canister location information for each drive or drive canister, automated data storage library 10 may use an automated addressing scheme that's based on the physical location of the drive. This is important because the library needs to know where (physically) to load and unload the cartridges and it needs to know which drive it is communicating with.

Figure 10:
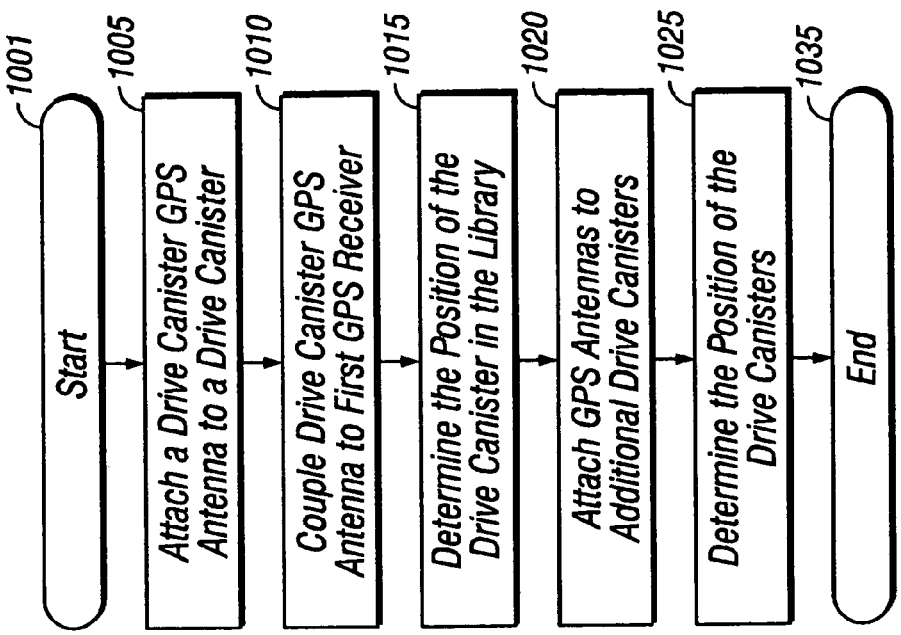
FIG. 10 is a flow chart showing the method of the fourth embodiment of the present invention.

The method of the fourth embodiment can be better understood by referring to flowchart 1000 shown in FIG. 10 and the block diagrams shown in FIGS. 6A-6C. At step 1005 a drive canister GPS antenna is attached to a drive or to a drive canister. A drive canister GPS antenna may comprise any GPS antenna used with a GPS system or a GPS antenna configured to be placed on or near a drive canister. A drive canister is used to simplify the process of swapping, moving or replacing drives within drive slots of the library. The drive canister may be located in any frame in automated data storage library 10, for example, left hand service bay 13, one or more storage frames 11, or right hand service bay 14. The drive canister GPS antenna may be attached to the drive canister at the time the library or drive is manufactured, assembled, modified or upgraded either at the factory, customer location or other location. The drive canister GPS antenna may be attached anywhere on the drive or drive canister. Attaching the drive canister antenna to the drive canister may comprise physical attachment to the drive canister, locating within proximity of the drive canister or coupling to the drive canister. In a preferred embodiment each drive canister GPS antenna is located at a fixed location on each drive canister. Some library implementations may use drive canisters and some may not. One skilled in the art will appreciate that the scope and intent of this invention does not change whether or not drive canisters are used. Herein, drive, data storage drive, data storage device, drive canister, and canister may be used interchangeably with respect to the present invention. At step 1010, the drive canister GPS antenna is coupled to first GPS receiver 610 to enable first GPS receiver 610 to receive GPS signals from the drive canister GPS antenna. At step 1015 first GPS receiver 610 provides drive canister location information to library controller 100, to enable library controller 100 to identify the precise location of the drive canister GPS antenna, and therefore determine the position of the drive canister in automated data storage library 10. At optional step 1020 additional drive canister GPS antennas are attached to one or more additional drive canisters in automated data storage library 10. At optional step 1025, library controller 100 receives location information that identifies the location of one or more drive canisters. The location information comprises drive canister location information from each drive canister GPS antenna to identify the precise location of each drive canister and therefore enables library controller 100 to determine the position of each drive canister in automated data storage library 10. The drive canister location information may comprise coordinates in the Latitude/Longitude coordinate system and may identify the physical location of one or more drive canisters in automated data storage library 10 or the drive canister location information may provide positional information relative to some other location or reference. In one variation of the fourth embodiment, library controller 100 uses location information from different drives or drive canisters to determine the location and/or communication address for each drive. For example, the library controller may know the physical spacing between drive slots. If the library controller knows the location of one drive and it knows the drive slot that this drive occupies, then the library controller could determine the location and/or position of all other drives based on the knowledge of drive spacing within the automated data storage library 10. In another variation of the fourth embodiment, library controller 100 uses the location information from another GPS antenna, separate from the drive canister GPS antenna(s), to determine the location, position and/or communication address for each drive. For example, any of the above described embodiments may be used with the fourth embodiment to provide location information to library controller 100 for any or all of the components in automated data storage library 10. The location information received by library controller 100 for any or all of the components, for example a library frame, is then used in combination with the drive canister location information received by library controller 100 to determine the location, position and/or communication address for each drive. While this variation requires another GPS antenna, it has the advantage of not requiring any knowledge about the specific location and drive slot of any drive because the location is based on a reference location of the additional GPS antenna.

The drive canister location information for each drive canister may be used by library controller 100 for many different purposes. For example, the physical position of each drive canister may be used by library controller 100 during assembly or reconfiguration of automated data storage library 10 to enable library controller 100 to automatically configure the library to operate with the current configuration of drive canisters. During operation of automated data storage library 10 the location information for the drive canisters obtained from the drive canisters GPS antennas enables the library controller 100 to automatically determine which data storage drive is communicating within the library because the position of the drive canister is determined. For example, the drive canister location information could be used to determine a frame number and slot number for each drive canister. This in turn could be the basis for an address of the drive and/or drive canister on a communication network by using the drive canister position to establish a communication address for each drive canister.

This invention has described some locations as "precise locations". One skilled in the art will appreciate that there are cases where "precise" may indicate a wider margin than in other cases. For example, when determining which frame an accessor is located in, a precise location may indicate a location with enough precision to identify the frame number. In another example, when determining where to locate an accessor for placing a cartridge in a drive, a precise location may indicate a location with several millimeters of precision.

Steps of the flowcharts described above may be changed, added or removed without deviating from the spirit and scope of the invention. While the preferred embodiments of the present invention have been illustrated in detail, the skilled artisan will appreciate that modifications and adaptations to those embodiments may be made without departing from the scope of the present invention as set forth in the following claims.

The invention disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

What is claimed is:

1. A method for using a GPS in an automated data storage library, said automated data storage library having one or more storage frames and a library controller for operating said automated data storage library, where said method comprises the steps of:
receiving a first GPS signal using a first GPS receiver;
providing information derived from said first GPS signal to said library controller;
obtaining location information from said information, said location information identifying a location of said automated data storage library, said location information identifying a location of at least one of one or more storage frames in said automated data storage library;
transmitting said location information to a receiving location;
determining a physical location for said automated data storage library from said location information;
determining a position of said at least one of said one or more storage frames in said automated data storage library;
adjusting said position of said at least one of said one or more storage frames to physically align said at least one of said one or more storage frames to said automated data storage library; and,
using said position of said at least one of said one or more storage frames to determine a frame number.

2. The method of claim 1, comprising the additional step of locating a current position of said automated data storage library on a street map.

3. The method of claim 1, comprising the additional step of locating said automated data storage library by use of a portable GPS receiver.

4. The method of claim 1, comprising the additional step of locating said automated data storage library by use of directions.

5. The method of claim 1, wherein said transmitting step is repeated at periodic intervals of time.

6. The method of claim 1, comprising the additional steps of:
repeating the method steps of claim 1 for a plurality of automated data storage libraries; and
identifying geographic locations of groups of said plurality of automated data storage libraries.

7. The method of claim 1, comprising the additional steps of:
receiving a second GPS signal with a second GPS receiver;
providing second information derived from said second GPS signal to said library controller;
obtaining second location information from said second information that identifies a location of at least one of said one or more storage frames in said automated data storage library; and
determining a position of said at least one of said one or more storage frames in said automated data storage library.

8. The method of claim 7, comprising the additional step of adjusting said position of said at least one of said one or more storage frames to physically align said at least one of said one or more storage frames to said automated data storage library.

9. The method of claim 7, comprising the additional step of using said position of said at least one of said one or more storage frames to determine a frame number.

10. The method of claim 1, wherein said automated data storage library further comprises an assessor and where said method comprises the additional steps of:
receiving a second GPS signal with a second GPS receiver;
providing second information derived from said second GPS signal to said library controller, wherein said second information comprises accessor location information that identifies the location of said assessor; and
determining a position of said accessor in said automated data storage library.

11. The method of claim 10, comprising the additional step of using said accessor location information to position said accessor to move data storage media.

12. The method of claim 1, wherein said automated data storage library further comprises one or more drive canisters, wherein said location information identifies a location of said one or more drive canisters and wherein said method comprises the additional step of determining a position of said at least one of said one or more drive canisters in said automated data storage library.

13. The method of claim 12, comprising the additional step of using said position to determine a communication address of said one or more drive canisters.

14. A system for providing location information comprising:
an automated data storage library having one or more storage frames;
a library controller for operating said automated data storage library;
a first GPS antenna attached to said automated data storage library; and
a first GPS receiver coupled to said first GPS antenna and coupled to said library controller, wherein
said library controller obtains location information from said first GPS receiver;
said location information identifies a location of said automated data storage library, said location information identifies a location of at least one of one or more storage frames in said automated data storage library;
said GPS receiver receives said location information;
said library controller determines a physical location for said automated data storage library from said location information;
said library controller determines a position of said at least one of said one or more storage frames in said automated data storage library;
said library controller adjusts said position of said at least one of said one or more storage frames to physically align said at least one of said one or more storage frames to said automated data storage library; and,
said library controller uses said position of said at least one of said one or more storage frames to determine a frame number.

15. The system of claim 14, wherein said location information identifies a physical location of said automated data storage library and said automated data storage library transmits said location information to a receiving location.

16. The system of claim 15, wherein said automated data storage library transmits said location information to a receiving location at periodic intervals of time.

17. The system of claim 14, further comprising a second GPS antenna attached to one of said one or more storage frames, wherein said second GPS antenna is coupled to said first GPS receiver and wherein said library controller determines a position of said at least one of said one or more storage frames in said automated data storage library.

18. The system of claim 14, further comprising:
a second GPS antenna attached to at least one of said one or more storage frames; and
a second GPS receiver coupled to said second GPS antenna and coupled to said library controller, wherein said library controller determines a position of said at least one of said one or more storage frames in said automated data storage library using said second GPS receiver.

19. The system of claim 14, further comprising:
an assessor;
a second GPS antenna attached to said accessor; and
a second GPS receiver coupled to said second GPS antenna and coupled to said library controller, wherein said library controller receives accessor location information for said accessor from said second GPS receiver.

20. A system for using a GPS in an automated data storage library, comprising:
one or more drive canisters;
a first GPS receiver;
a library controller coupled to said first GPS receiver; and
at least one drive canister GPS antenna attached to at least one of said one or more drive canisters, wherein said drive canister GPS antenna is coupled to said first GPS receiver, and wherein
said library controller receives drive canister location information for said at least one of said one or more drive canisters from said first GPS receiver;
said location information identifies a location of said automated data storage library,
said location information identifies a location of at least one of one or more storage frames in said automated data storage library;
said GPS receiver receives said location information;
said library controller determines a physical location for said automated data storage library from said location information;
said library controller determines a position of said at least one of said one or more storage frames in said automated data storage library;
said library controller adjusts said position of said at least one of said one or more storage frames to physically align said at least one of said one or more storage frames to said automated data storage library; and,
said library controller uses said position of said at least one of said one or more storage frames to determine a frame number.

21. The system of claim 20 further comprising:
a second GPS antenna attached to one of said one or more library frames; and
a second GPS receiver coupled to said library controller and coupled to said second GPS antenna, wherein said library controller determines a position of said at least one of said one or more drive canisters in said automated data storage library.

22. An article of manufacture comprising a data storage medium tangibly embodying a program of machine-readable instructions executable by a digital processing apparatus for using a GPS in an automated data storage library, said automated data storage library having one or more storage frames, a first GPS receiver for receiving a first GPS signal and a library controller for operating said automated data storage library, where said instructions are configured for:
providing information derived from said first GPS signal to said library controller; and
obtaining location information from said information, said location information identifying a location of said automated data storage library, said location information identifying a location of at least one of one or more storage frames in said automated data storage library;
transmitting said location information to a receiving location;
determining a physical location for said automated data storage library from said location information;
determining a position of said at least one of said one or more storage frames in said automated data storage library;
adjusting said position of said at least one of said one or more storage frames to physically align said at least one of said one or more storage frames to said automated data storage library; and,
using said position of said at least one of said one or more storage frames to determine a frame number.

23. The article of manufacture of claim 22, wherein said instructions are further configured for locating a current position of said automated data storage library on a street map.

24. The article of manufacture of claim 22, wherein said instructions are further configured for locating said automated data storage library by use of a portable GPS receiver.

25. The article of manufacture of claim 22, wherein said instructions are further configured for locating said automated data storage library by use of directions.

26. The article of manufacture of claim 22, wherein said transmitting is repeated at periodic intervals of time.

27. The article of manufacture of claim 22, wherein said instructions are further configured for:
repeating the method steps of claim 30 for a plurality of automated data storage libraries; and
identifying geographic locations of groups of said plurality of automated data storage libraries.

28. The article of manufacture of claim 22, wherein said automated data storage library further comprises a second GPS receiver for receiving a second GPS signal and wherein said instructions are further configured for:
providing second information derived from said second GPS signal to said library controller;
obtaining second location information from said second information that identifies a location of at least one of said one or more storage frames in said automated data storage library; and
determining a position of said at least one of said one or more storage frames in said automated data storage library.

29. The article of manufacture of claim 28, wherein said instructions are further configured for adjusting said position of said at least one of said one or more storage frames to physically align said at least one of said one or more storage frames to said automated data storage library.

30. The article of manufacture of claim 28, wherein said instructions are further configured for using said position of said at least one of said one or more storage frames to determine a frame number.

31. The article of manufacture of claim 22, wherein said automated data storage library further comprises an assessor, a second GPS receiver for receiving a second GPS signal and wherein said instructions are further configured for:
- providing second information derived from said second GPS signal to said library controller, wherein said second information comprises accessor location information that identifies the location of said assessor; and
- determining a position of said accessor in said automated data storage library.

32. The article of manufacture of claim 31, wherein said instructions are further configured for using said accessor location information to position said accessor to move data storage media.

33. The article of manufacture of claim 22, wherein said automated data storage library further comprises one or more drive canisters, wherein said location information identifies a location of said one or more drive canisters and wherein said instructions are further configured for determining a position of said at least one of said one or more drive canisters in said automated data storage library.

34. The article of manufacture of claim 33, wherein said instructions are further configured for using said position to determine a communication address of said one or more drive canisters.

* * * * *